May 31, 1932.  A. HUREWITZ  1,860,857
FASTENING DEVICE FOR PINS
Filed May 20, 1931
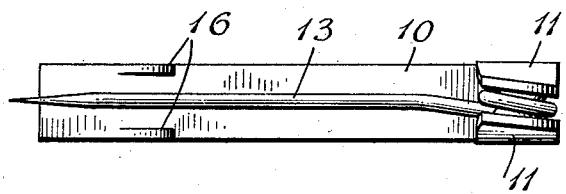
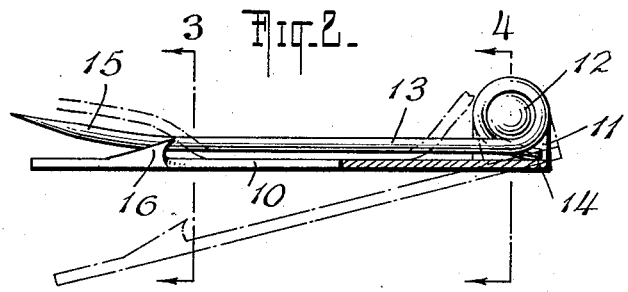
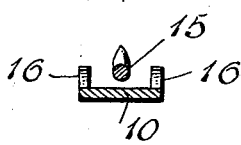
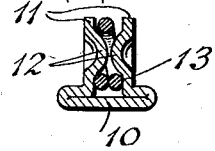
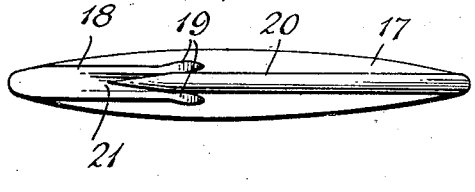
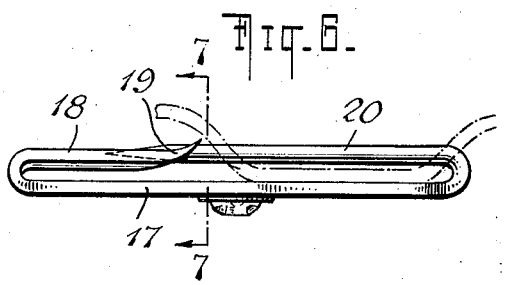
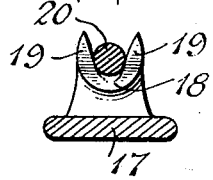
INVENTOR
ALEXANDER HUREWITZ
BY
ATTORNEYS Patented May 31, 1932

1,860,857

UNITED STATES PATENT OFFICE

ALEXANDER HUREWITZ, OF BRONX, NEW YORK

FASTENING DEVICE FOR PINS

Application filed May 20, 1931. Serial No. 538,752.

This invention relates to improvements in fastening devices for pins, such as brooches, clasps and the like, and has for one of its objects to provide an improved device of simple and practical construction which will adequately prevent accidental detachment of the pin from the article to which it is secured.

The above and other objects will appear more clearly from the following detailed description, when taken in connection with the accompanying drawings, which illustrates a preferred embodiment of the inventive idea.

In the drawings—

Figure 1 is a plan view of one form of the device constructed in accordance with the invention;

Figure 2 is a side elevation, partly broken away and shown in section, the dotted lines indicating the position of the device as the pin thereof is inserted through a fabric preparatory to being engaged with the body of the device;

Figure 3 is a section on the line 3—3 of Figure 2;

Figure 4 is a section on the line 4—4 of Figure 2;

Figure 5 is a view similar to Figure 1, showing a slightly different form of the invention;

Figure 6 is a side elevation thereof; and

Figure 7 is a section on the line 7—7 of Figure 6.

Referring more particularly to Figures 1 to 4 of the drawings, the pin is shown as comprising a body portion 10 in the form of a bar provided at one end thereof with laterally extending and opposed lugs 11 having instruck studs 12 about which is coiled one end of an attaching pin 13. The studs 12 thus provide a connection between the bar 10 and the pin 13 which permits of relative pivotal movement between said elements, and the extremity 14 of the coil of said pin engages the bar so as to normally maintain the pin 13 in substantially parallel relation to said bar. Said pin is coextensive with the bar and has the free pointed end 15 thereof bent slightly so as to better enable the pin to be inserted through an article, such as a fabric indicated in dotted lines in Figure 2, without spreading the pin and bar apart.

Adjacent the end of the bar remote from the studs 12 the former is provided along its longitudinal edges and on opposite sides of the pin 13 with a pair of laterally extending prongs 16 which project toward the opposite end of the bar and into the plane of the pin 13 when the latter is in its normal position. When the pin 13 has been extended through an article, as shown in Figure 2, the prongs 16 act as a locking means to prevent accidental detachment of the device from the article to which it is attached, said prongs being adapted to penetrate said article adjacent the point where the free end of the pin 16 projects therefrom.

In Figures 5 to 7, the pin 17 is again of bar form and shown in the nature of a clasp or brooch, one end of which is reduced and bent upon itself to form an extension 18 substantially parallel to the body portion of the device, with the free extremity of said extension bifurcated to form a pair of laterally extending prongs 19. The opposite end of the body portion is also reduced and bent upon itself to provide the attaching pin 20 which normally extends in parallel relation to said body portion and the free extremity of which engages between the prongs 19 and in a recess 21 in the extension 18 so as to countersink the point of the pin for protective purposes. When the device has been attached to an article, as indicated in Figure 6, the prongs 19 are adapted to penetrate said article should the device have any tendency to become detached from the same.

In both forms of the invention as shown it is only necessary to effect a pivotal movement of the attaching pin relative to the body portion of the device, or vice versa, to enable said pin to be detached from the article without causing the prongs 16 or 19 to penetrate the latter.

What is claimed is:

A device of the character described, comprising a body portion having one end reduced and bent upon itself and provided at its extremity with laterally projecting prongs extending in the direction of the opposite end of said body portion, said end further having a groove in its outer surface extending between said prongs, and a pin formed upon the projecting from said opposite end of the body portion and having its free end engageable in said groove and between said prongs.

In testimony whereof, I have affixed my signature.

ALEXANDER HUREWITZ.